July 2, 1968   G. W. STILLEY ET AL   3,390,911
GLASS GRIPPING TONGS
Filed April 27, 1967

INVENTORS
GEORGE W. STILLEY and
JOSEPH D. KELLY

BY
ATTORNEYS

United States Patent Office 3,390,911
Patented July 2, 1968

3,390,911
GLASS GRIPPING TONGS
George W. Stilley, Freeport, and Joseph D. Kelly, Cheswick, Pa., assignors to Pittsburgh Plate Glass Company, Pittsburgh, Pa., a corporation of Pennsylvania
Filed Apr. 27, 1967, Ser. No. 634,294
3 Claims. (Cl. 294—118)

ABSTRACT OF THE DISCLOSURE

Tongs for gripping glass sheets for thermal treatment having glass engaging elements, each comprising a base provided with a thin refractory coating having substantially less heat conductivity than the base on which the coating is applied and a greater coefficient of friction with glass than the base at a relatively low temperature at which glass sheets are usually inserted into tongs for thermal treatment and a lesser coefficient of friction with glass than the base at a relatively high temperature at which glass sheets are usually disengaged from tongs after thermal treatment.

---

This invention relates to glass gripping tongs, and particularly refers to tongs adapted to suspend glass sheets and the like during thermal treatment. The tongs have arms pivoted together and glass engaging elements carried by the arms. The arms and their glass engaging elements are arranged to urge the glass engaging elements toward each other when the tongs are suspended so as to grip a glass sheet therebetween.

Glass sheets have been suspended by tongs which grip the upper glass sheet surfaces near the upper glass edge for thermal treatment involved in tempering, coating, press bending, and combinations of these operations which include conveying the glass sheets through atmospheres of different temperatures where the glass is subject to such treatment.

The glass contacting elements of the prior art tongs left something to be desired. If made of stainless steel or another material nonreactive to glass at the elevated temperatures of glass processing, the difference in specific heat and thermal conductivity between the glass and the metal resulted in a considerable difference in the rate of temperature change of the glass and the glass contacting element in response to a change in environmental temperature to which the glass is exposed.

Traditionally, the glass engaging elements of tongs have been in the form of stainless steel pins whose pointed extremities penetrated the major surfaces of the glass. When it is necessary to heat glass to a temperature hotter than 1200 degrees Fahrenheit, while stainless steel resists oxidation, glass engaging elements of this material develop a relatively strong cohesiveness to glass. When the glass softens, permitting penetration of the metal tips of the glass engaging members, the glass tends to develop vents and other flaws because of the cohesion between the glass and the metal. It has been proposed in U.S. Patent No. 3,273,933 to Jochim to incorporate crystalline grains in a metal binder and have only the crystalline grains contact the glass. Such tongs are useful as long as the grains remain intact. However, such grains of crystalline material wear quite rapidly and the glass is immediately exposed to direct contact with the metal as in prior art tongs.

In U.S. Patent No. 3,089,727 to Hay, the glass engaging elements are in the form of freely rotatable discs whose peripheral margins engage the glass. Such tongs tend to apply the gripping force over a larger rounded area instead of at a single point and hence result in less damage to the glass surface. However, the cohesion of the stainless steel to the glass at elevated temperatures required to temper the glass causes some vents and flaws in the region of the glass that is gripped between the glass engaging discs of the Hay tongs.

It has been proposed to replace the metal disc tongs suggested in the Hay patent with glass contacting elements composed of a fired ceramic composition such as one having a very high aluminum oxide content formed by firing at a temperature of about 1500 degrees centigrade. Such materials are very useful in handling glass sheets up to a certain size. A glass sheet larger than those having a weight in excess of about 5 pounds per set of tongs develops a force that causes the glass engaging elements of the tongs to move against one another at pressures that cause the engaging elements to be subject to damage. In order to avoid damage of these parts, it is necessary that the ceramic discs be relatively thick, for example $3/16$ inch and thicker compared to $1/16$ inch and less for stainless steel discs, in order to have sufficient structural rigidity to minimize their susceptibility to damage. Such thicknesses cause an interference in the flow of chilling air during the quenching that follows a thermal treatment operation which is necessary to heat-strengthen the glass. Hence, glass sheets tempered while gripped by ceramic disc tongs have lower compression stresses than those desired in the vicinity of the relatively thick glass gripping elements.

The present invention has determined that tongs can be provided with glass gripping elements composed of a base of stainless steel and adhered thereon a coating of a refractory metal oxide having the desirable properties of substantially less heat conductivity than the stainless steel base, and a greater coefficient of friction with glass than stainless steel at the relatively low temperature at which glass sheets are usually inserted into tongs for thermal treatment and a lesser coefficient of friction and less cohesion with glass than the stainless steel base at a relatively high temperature at which glass sheets are usually disengaged from tongs after thermal treatment. Use of a stainless steel base enables a relatively thin disc to be used as a glass engaging element and the use of the thin coatings adhering to the perimeter of the disc permits the tongs to provide the best structural features of stainless steel glass engaging elements with the best features of the ceramic disc tongs so as to improve the appearance and the stress pattern in the glass articles produced by thermal treatment in which they are gripped by tongs.

A preferred embodiment of the present invention will now be described in order to facilitate an understanding of the present invention.

In the drawings which form part of the description, and wherein like reference numerals refer to similar structural elements, FIG. 1 is a fragmentary elevational view of a pair of glass gripping tongs taken across the thickness of the upper portion of the glass sheet;

Figure 1:
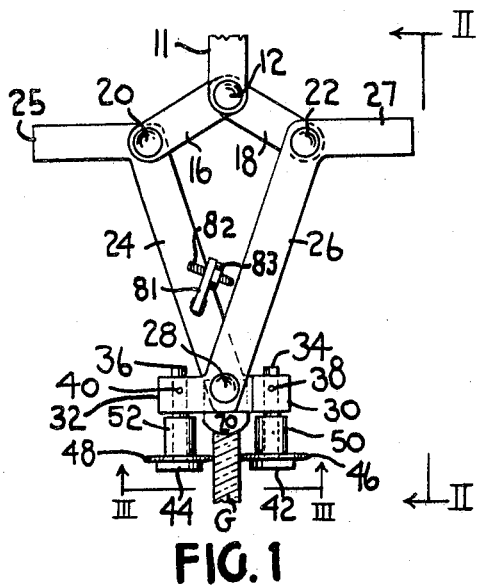
Figure 2:
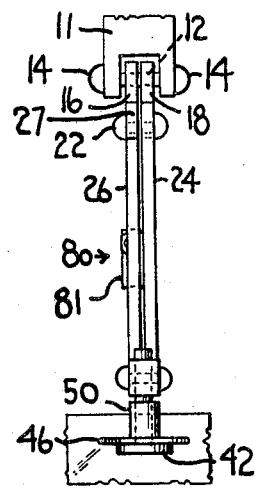
FIG. 2 is an end view taken along the lines II—II of FIG. 1.
Figure 3:
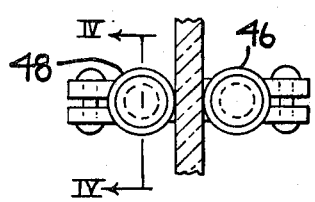
FIG. 3 is a fragmentary section view taken along the lines III—III of FIG. 1.
Figure 4:
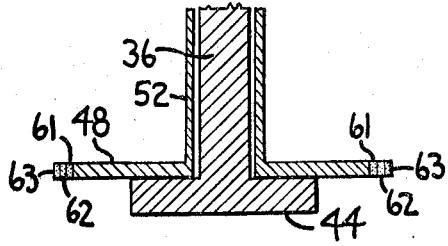
FIG. 4 is a fragmentary sectional view taken along the lines IV—IV of FIG. 3.

In the drawings, an apertured clevis 11 is carried by a carriage (not shown) supported on a monorail (not shown). The latter extends through a heating furnace of tunnel-like configuration and a fluid imparting apparatus, neither of which is shown but both of which are well known in the art.

The fluid imparting apparatus may be either an air blasting station for tempering or heat-strengthening heated glass sheets suspended on tongs or a fluid spraying station to impart a coating to the tong suspended glass sheets. Since neither the heating furnace nor the air blasting or fluid spraying stations are part of the present invention, they are not described in detail herein.

The apertured clevis 11 supports a tong support pin 12 through its aperture. Enlarged head rivets 14 secure the tong support pin 12 in place on the clevis. Links 16 and 18 are pivoted to tong support pin 12 at their upper ends. At their lower ends, links 16 and 18 carry one of a pair of link pins 20 and 22. Link pins 20 and 22 are provided with enlarged head rivets for the same purpose as tong support pin 12. A tong arm 24 having a horizontal extension 25 is apertured at its upper portion to receive link pin 20 and a tong arm 26 having a horizontal extension 27 is apertured at its upper portion to receive link pin 22. Link pin 20 pivotally attaches the upper portion of tong arm 24 to the lower portion of link 16, whereas link pin 22 pivotally secures the lower portion of link 18 to the upper portion of tong arm 26. A common hinge pin 28 secures tong arms 24 and 26 to one another near their lower portion.

Beyond the common hinge pin 28 tong arm 24 forms a lower apertured extension 30 and tong arm 26 forms a similar apertured extension 32. A rod 34 extends through a vertical aperture in apertured extension 30, while a similar rod 36 extends through a vertical aperture in apertured extension 32. Each rod has a diametrically extending hole that matches with cross holes extending horizontally through the apertured extensions 30 and 32. This permits cotter pins 38 and 40 to secure the rods 34 and 36 to extensions 30 and 32.

The lower end of rod 34 has an enlarged head 42 and the lower end of rod 36 has a similar enlarged head 44. A disc 46 is rotatably mounted around rod 34 and makes bearing contact with the upper surface of head 42. Another disc 48 is similarly mounted around rod 36 to make bearing contact with the upper surface of head 44. Each disc is apertured and forms a bottom flange of a flanged sleeve. Sleeve 50 extends upward from apertured disc 46 and sleeve 52 extends upward from apertured disc 48. The sleeves 50 and 52 form a unitary structure with the apertured discs and are rotatably mounted around rods 34 and 36 respectively. The discs 46 and 48 have larger diameters than the heads 42 and 44 and are concentrically mounted about the rods 34 and 36 respectively. Thus, their peripheral edges, which are about .06 inch thick, make free rotating contact with the opposite major surfaces of the glass sheet G. It is thus seen that the discs 46 and 48 serve as glass engaging elements carried by the tong arms 24 and 26 wherein the arms 24 and 26 and the glass engaging elements 46 and 48 are arranged to urge the glass engaging elements toward each other when the tongs are freely suspended.

The tongs are also provided with a stop member 70 formed as a thin shim having a convexly rounded bottom edge that contacts the upper edge of the glass sheet G to prevent the latter from entering too deeply into the tongs. By controlling the uppermost position of the glass within the tongs, any tong marking is limited to a location very close to the uppermost edge of the glass and is hidden in the frame within which the fabricated glass article is installed. Tongs provided with such a stop are described and claimed in U.S. Patent No. 2,991,114 to Lee R. Robinson.

The tong structure containing the glass gripping elements in the form of freely rotatable discs is described and claimed in U.S. Patent No. 3,089,727 to William J. Hay, except for the fact that the prior art tongs has glass engaging elements made of stainless steel.

The discs 46 and 48, which form the glass engaging elements of the tongs exemplifying one embodiment of the present invention, are provided with a thin refractory coating containing a major portion of an oxide of a metal different from the predominant metal of the base. The coating has substantially less heat conductivity than the base and a greater coefficient of friction with glass than the base at a relatively low temperature at which glass sheets are usually inserted into the tongs for thermal treatment and a lesser coefficient of friction with glass and a lesser wetting characteristic than the base at a relatively high temperature at which glass sheets are usually disengaged from tongs after such a thermal treatment.

The thin coating is applied to the peripheral wall of the glass engaging element or disc, which is the only portion of the tongs that comes into direct contact with the glass sheet.

Preferably, the base consists essentially of stainless steel and the thin refractory coating preferably consists essentially of a substantially non-ferrous composition. The non-ferrous coating composition is a refractory composition having the requisite characteristics described hereinabove. For example, the refractory composition may consist essentially of a composition taken from the class consisting of zirconia, alumina, magnesium zirconate, nickel aluminide, titanium dioxide and mixtures or layers thereof.

The coating applied to the glass engaging members comprises an inner layer 61 of a material adherent to the base throughout the temperature of the thermal treatment to which the glass is to be exposed, an intermediate layer 62 of a material adhering to said layer 61, and another glass contacting layer 63 adhering to said intermediate layer 62 throughout the temperature range and having the requisite properties of substantially greater coefficient of friction with glass than the base at a relatively low temperature and comparatively lesser coefficient of friction with glass at a relatively high temperature and having substantial non-wetting characteristics with respect to glass at elevated temperatures.

While many materials were successfully tried for the various coatings, the best arrangement found to date was a multiple coating of three layers, each of unknown thickness, but totalling a maximum of .010 inch thick. Each of the layers was composed of a material capable of withstanding repeated changes of temperature between about 50 degrees Fahrenheit and about 1250 degrees Fahrenheit without any appreciable chemical deterioration.

The best results were obtained using nickel aluminide as the first coating 61, a cermet of 30 percent nickel aluminide and 70 percent alumina as the intermediate layer 62 and an outer layer 63 of alumina containing a trace of titanium dioxide. This coating demonstrated an ability to withstand the abuses of the tempering process for a very large number of cycles. As of the time of the writing of this application, the coating had withstood several hundred tests without showing any sign of deterioration.

The improved tongs of the present invention were also provided with a limit means 80 to limit the closest approach of the glass engaging elements to one another to .090 inch for tongs processing glass sheets of ⅛ inch thickness. The limit means 80 comprises an apertured plate 81 with an externally threaded shaft 82 adjustable lengthwise through the aperture in plate 81 and a lock nut 83 to fix the position of the shaft 82 relative to plate 81. The plate 81 is welded to the tong arm 24 with shaft 82 extending toward the side wall of tong arm 26. When the glass engaging members (tong discs 46 and 48) engage the heat-softened glass sheet G, their penetration into the glass is limited by the end of shaft 82 abutting the side wall of tong arm 26, thus preventing further tong penetration into the glass.

Several experiments were conducted to compare the strength of tempered glass sheets produced while gripped by tongs having glass gripping elements of uncoated discs and pointed members and discs coated according to the teachings of the present invention. All these tests were done to determine if the tongs with glass engaging members of metal oxide coated steel are superior to the other types when used with thin (1/8" thick) glass. In every case, the glass sheets processed on tongs having glass engaging members of metal oxide coated steel were shown to be stronger than glass sheets gripped by tongs having uncoated metal glass engaging members.

The first tests were conducted using tongs without limit means as follows:

Five samples of 1/8" x 8" x 8" glass sheet were tempered while gripped by one of the types of tongs enumerated below and stressed at the tong mark by loading the edge portion of the samples as simple beams with the load concentrated at the tong mark until the glass broke and the results were compared. The load was applied by resting each sample on a pair of rods spaced 2 inches on either side of the tong mark and applying a downward force through a stub rod extending inward from the glass edge to beyond the tong mark.

In the first test, the following data were collected from the glass sheets tempered while gripped by tongs constructed as follows:

TABLE I

| Samples engaged by tongs having: | Average breaking force, pounds |
|---|---|
| (a) Metal oxide coated steel discs | 91.5 |
| (b) Regular steel discs (uncoated) | 87.0 |
| (c) Steel points | 44.5 |

A second test was conducted with additional 1/8" x 8" x 8" square samples of glass weighted with a steel weight hung through a hole drilled in the glass to cause the glass to appear heavier to the tongs. These results are tabulated below in Table II:

TABLE II

| Samples engaged by tongs having: | Average breaking force, pounds |
|---|---|
| (a) Metal oxide coated steel discs | 88.0 |
| (b) Regular steel discs (uncoated) | 80.0 |
| (c) Steel points | 69.0 |

A third test was conducted using tongs having the space between the tong points at the closed position mechanically limited with a set screw arrangement between the arms of the tongs as in limit means 80. This adjusted to .090 inch while processing glass sheets ranging in thickness from .116 to .124 inch (nominal thickness 1/8 inch). Glass tempered with this arrangement was tested. No relationship between glass thickness and breaking force was observed. The results are as shown in Table III:

TABLE III

| Samples engaged by tongs having: | Average breaking force, pounds |
|---|---|
| (a) Metal oxide coated steel discs | 120.0 |
| (b) Regular steel discs (uncoated) | 83.8 |
| (c) Steel points | 79.0 |

(A control sample glass sheet was broken in a similar manner at an edge not damaged by tongs with the following breaking force needed.)

| (d) Undamaged glass | 156.0 |
|---|---|

In still another test, groups of 12 backlights each about 20 inches by 60 inches by 1/8 inch were tested. The first group was processed while gripped by tongs having uncoated steel discs that engaged the glass; the second group was produced on tongs having metal oxide coated steel discs. The results were tabulated in Table IV as follows:

TABLE IV

| Samples engaged by tongs having— | Average breaking force (pounds) | Average stress at fracture origin (pounds per square inch) | Average glass thickness (inch) | Average net thickness at tong mark (inch) |
|---|---|---|---|---|
| Regular steel discs | 57 | 7,560 | .118 | .093 |
| Ceramic coated steel discs | 133 | 11,500 | .114 | .095 |

The form of the invention shown and described in this disclosure represents an illustrative preferred embodiment thereof. It is understood that various changes may be made without departing from the spirit of the invention as defined in the claimed subject matter that follows.

What is claimed is:

1. Tongs adapted to suspend glass sheets and the like which have arms pivoted together and glass engaging elements carried by the arms, the arms and glass engaging elements being arranged to urge the glass engaging elements toward each other when the tongs are suspended, said glass engaging elements being composed of a steel base and a thin refractory coating containing a glass engaging surface consisting essentially of a composition taken from the class consisting of zirconia, alumina, magnesium zirconate, nickel aluminide, titanium dioxide and mixtures thereof.

2. Tongs adapted to suspend glass sheets and the like which have arms pivoted together and glass engaging elements carried by said arms, the arms and glass engaging elements being arranged to urge the glass engaging elements toward each other when the tongs are suspended, said glass engaging elements being composed of a steel base and at least one thin refractory coating containing a major portion of an oxide of a metal different from the predominant metal of said base, said coating having substantially less heat conductivity than said base and a greater coefficient of friction with glass than said base at a relatively low temperature at which glass sheets are usually inserted into said tongs for thermal treatment and a lesser coefficient of friction with glass than said base at a relatively high temperature at which glass sheets are usually disengaged from said tongs after said thermal treatment, wherein said thin refractory coating comprises an inner layer of a material adherent to said base throughout the temperature range of said thermal treatment, an intermediate layer of a material adherent to said inner layer, and an outer glass contacting layer adherent to said intermediate layer throughout said temperature range and having a greater coefficient of friction with glass than said base at a relatively low temperature at which glass sheets are usually inserted into said tongs for thermal treatment and a lesser coefficient of friction with glass than said base at a relatively high temperature at which glass sheets are usually disengaged from said tongs after said thermal treatment, each of said layers being capable of withstanding repeated changes of temperature between about 50 degrees Fahrenheit and about 1250 degrees Fahrenheit without any appreciable chemical deterioration.

3. Tongs as in claim 2, wherein said base consists essentially of stainless steel, said inner layer consists essentially of nickel aluminide, said intermediate layer consists essentially of a cermet consisting essentially of a mixture of nickel aluminide and alumina and said glass contacting layer consists essentially of alumina containing a trace of titania.

References Cited

UNITED STATES PATENTS

| | | | |
|---|---|---|---|
| 3,025,638 | 3/1962 | Krawetzke et al. | 214—1 |
| 3,089,727 | 5/1963 | Hay | 294—18 |

RICHARD E. AEGERTER, *Primary Examiner.*

R. D. GUIOD, *Assistant Examiner.*